United States Patent
Wood et al.

(10) Patent No.: US 6,796,528 B2
(45) Date of Patent: Sep. 28, 2004

(54) ATTACHMENT APPARATUS FOR INJECTED-MOLDED CANOPIES

(75) Inventors: Jeffrey H. Wood, Eureka, MO (US); Joseph M. Colich, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/366,949

(22) Filed: Feb. 13, 2003

(65) Prior Publication Data

US 2004/0159742 A1 Aug. 19, 2004

(51) Int. Cl.[7] .................................................. B64C 1/10
(52) U.S. Cl. ..................................... 244/121; 244/129.4
(58) Field of Search ............................. 244/121, 129.1, 244/129.4, 129.5; 49/499.1; 277/646

(56) References Cited

U.S. PATENT DOCUMENTS

| | | | |
|---|---|---|---|
| 2,258,724 A | | 10/1941 | Wagner et al. |
| 2,367,035 A | * | 1/1945 | McConnell et al. ........ 244/121 |
| 2,511,168 A | | 6/1950 | Martin et al. |
| 2,680,582 A | * | 6/1954 | Hansen et al. ........... 244/129.3 |
| 2,720,011 A | * | 10/1955 | Krupp ..................... 244/129.3 |
| 2,934,801 A | * | 5/1960 | Blaskowski .............. 244/129.3 |
| 3,618,881 A | | 11/1971 | Fellers et al. |
| 4,004,388 A | | 1/1977 | Stefanik |
| 4,370,831 A | * | 2/1983 | Hamilton ..................... 49/477 |
| 4,463,530 A | * | 8/1984 | Breithaupt, Albert ........ 52/171 |
| 4,580,745 A | | 4/1986 | Brophy |
| 4,624,426 A | * | 11/1986 | Muscatell ............... 244/135 R |
| H451 H | * | 4/1988 | Pinnell ....................... 244/121 |
| 5,085,383 A | | 2/1992 | Larkin et al. |
| 5,984,234 A | * | 11/1999 | Brouwer et al. ......... 244/129.5 |
| 6,401,398 B1 | * | 6/2002 | Panayides et al. ......... 49/498.1 |
| 6,457,675 B1 | * | 10/2002 | Plude et al. ............. 244/129.5 |

* cited by examiner

*Primary Examiner*—Galen Barefoot
(74) *Attorney, Agent, or Firm*—Black Lowe & Graham PLLC

(57) ABSTRACT

A system and method for attaching an injection molded canopy to a vehicle is provided. The system includes a canopy rail attached to the vehicle and an injection-molded canopy that is molded to be securely received by the canopy rail. The canopy is a polycarbonate or acrylic frameless canopy. The system also includes a seal, a canopy position sensor, a sealing component, and a canopy handle for controlling position of the canopy. The sealing component inflates the one or more seals with one of a liquid or gas when the canopy is sensed in the closed position. The system also includes a ground sensor. The sealing component deflates the seal if the canopy handle is in an open position and the aircraft is on the ground.

17 Claims, 6 Drawing Sheets

ATTACHMENT APPARATUS FOR INJECTED-MOLDED CANOPIES

RELATED APPLICATIONS

This invention relations to copending U.S. patent application Ser No. 10/367,024, filed Feb. 13, 2003, U.S. patent application Ser. No. 10/367,064, filed Feb. 13, 2003, U.S. patent application Ser. No. 10/367,404, filed Feb. 13, 2003, U.S. patent application Ser. No. 10/367,403, filed Feb. 13, 2003, U.S. patent application Ser. No. 10/367,062, filed Feb. 13, 2003, all of which are hereby incorporated by reference.

GOVERNMENT LICENSE RIGHTS

This invention was made with Government support under U.S. Government contract F33615-97-2-3407 awarded by the U.S. Air Force. The Government has certain rights in this invention.

FIELD OF THE INVENTION

This invention relates generally to vehicles with canopies and, more specifically, to closing mechanisms for injection-molded canopies.

BACKGROUND OF THE INVENTION

Modern aircraft canopies contain many parts. A transparent portion of the canopy may he replaced several times during the life of an aircraft due to scratches and general deterioration. Replacement of the transparent portion entails frame disassembly and reassembly. This is time-consuming, labor intensive, and costly.

Attempts have been made to produce frameless aircraft canopies in order to simplify replacement of the transparent portion, among other reasons. However, viable frameless canopy system must include a method for latching. As is known, the frame provides structural stiffness and strong, secure, attachment points for hinges and latches. Prior latching methods include a male hook or pin located on the aircraft structure or canopy frame and a female receiver on the canopy frame structure or aircraft structure respectively. Such discrete latching methods produce concentrated loads, which cause bearing stress in the transparency in the region of the latch.

Stress causes problems for transparencies. Glassy polymers craze at low stress levels. The effect of crazing on crack growth and localized failure is not well understood. Polymer transparencies yield at low stress levels and creep occurs after a fraction of service life. Cyclic, long-term loading, such as cockpit pressurization, induces creep and/or craze and reduces service life. Elevated temperatures, such as those experienced by high-speed aircraft, further increase the rate of creep and amplify the effect of crazing.

Therefore, there exists an unmet need to produce a latching system for an injection-molded canopy which avoids plastic creep and crazing due to concentrated loads yet securely holds the canopy in place.

SUMMARY OF THE INVENTION

The present invention provides a system and method for attaching an injection-molded canopy to a vehicle that avoids plastic creep and crazing due to concentrated loads while securely holding the canopy in place. The system includes a canopy rail attached to the vehicle and an injection-molded canopy that is molded to be securely received by the canopy rail. The canopy is at least one of a polycarbonate or acrylic frameless canopy. The system also includes a seal, a canopy position sensor for sensing position of the canopy, a sealing component, and a canopy handle for controlling position of the canopy. The sealing component inflates the seal with one of a liquid or gas when the canopy is sensed in the closed position In one aspect of the invention, the vehicle is an aircraft and the system includes a ground sensor for sensing when the aircraft is on the ground. The sealing component deflates the seal if the canopy handle is in an open canopy position and the aircraft is sensed to be on the ground.

In another aspect of the invention, the canopy includes a channel for receiving the one or more seals.

In another aspect of the invention, the canopy is injection molded with protrusions, and the canopy rail includes flanges that mate with the protrusions when the canopy is placed in a closed and locked position within the canopy rail.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
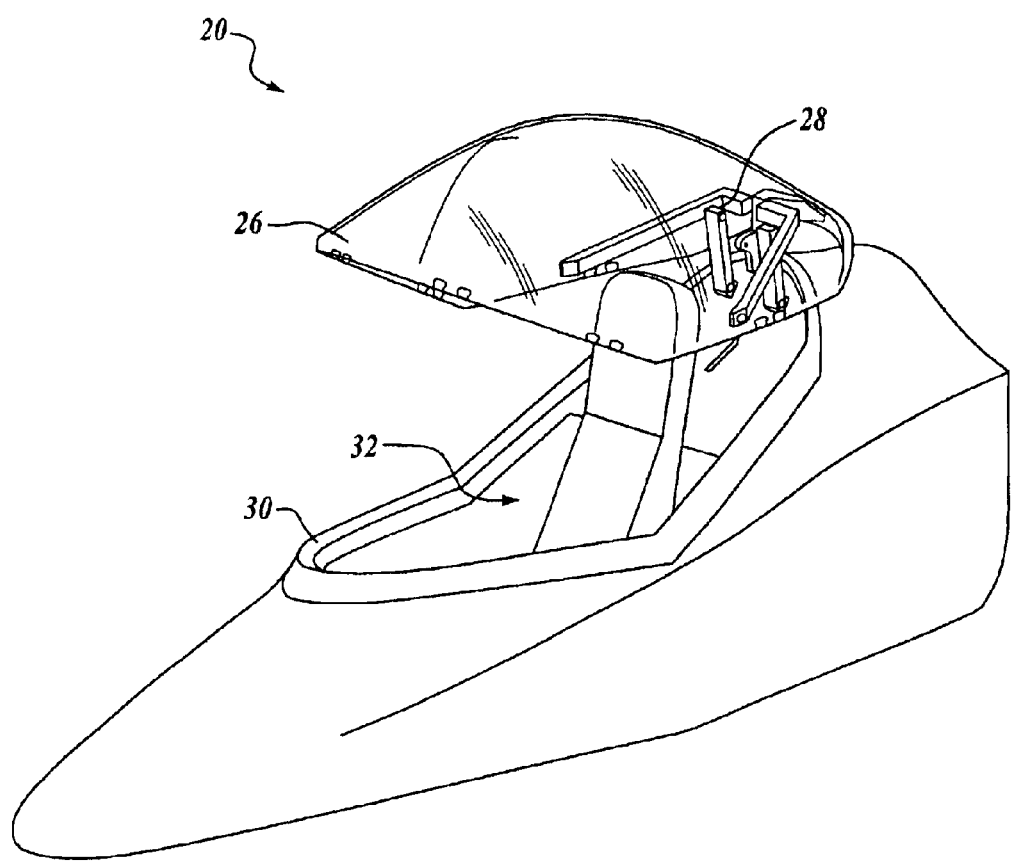
FIG. 1 is a perspective view of a portion of an aircraft and cockpit with a frameless canopy in an open position.

The present invention includes attachment mechanisms for an injection molded, frameless canopy. As shown in FIG. 1, a frameless canopy 26, such as without limitation a polycarbonate or acrylic injection-molded canopy, is attached to a hinge mechanism 28 that opens and closes the frameless canopy 26 about a cockpit 32 of a vehicle 20, such as an aircraft. The frameless canopy 26 is injection-molded with a base edge shaped to mate with a canopy rail 30 that surrounds the cockpit 32 and is fixed to the vehicle 20. Advantageously, no heavy machining of the canopy 26 is required, because the canopy 26 is molded to be received securely by the canopy rail 30. Thus, the integrity of the frameless canopy 26 is maintained thereby allowing for a long service life.

Figure 2:
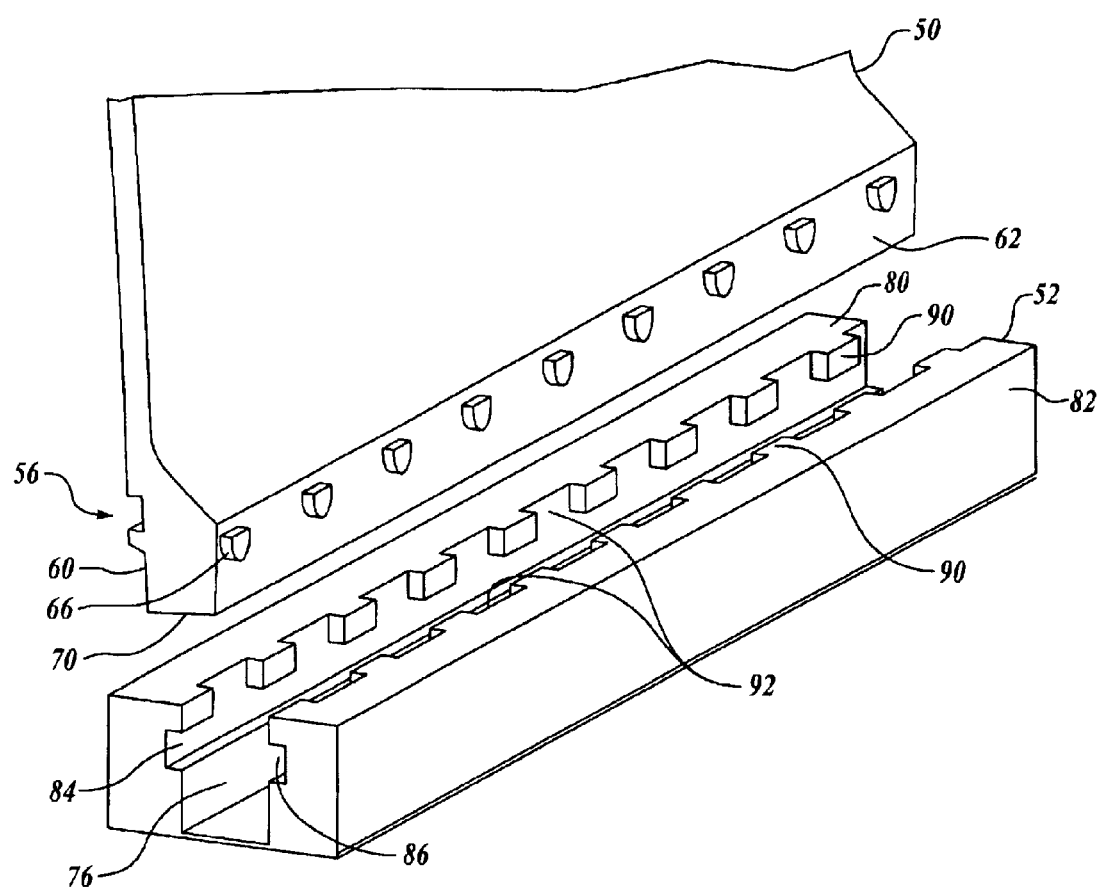
FIG. 2 is a perspective view of a portion of a frameless canopy and rail formed in accordance with a first embodiment of the present invention.

FIG. 2 illustrates a partial perspective view of an injection-molded frameless canopy 50 that is molded to be received by a canopy rail 52. The canopy 50 includes a base section 56 that includes an inboard side 60, an outboard side 62, and a base edge 70. The inboard and outboard sides 60 and 62 include a row of securing pins 66. The row of securing pins 66 are spaced apart at a predefined distance from each other and are located a predefined height from the base edge 70. Each pin 66 extends through and out from the respective side 60 or 62 and is rounded on a side closest to the base edge 70 and flat on a side furthest from the base edge 70, thereby forming a shape of a "D" laid on its side. The pins 66 are metallic pins installed in the injection mold and molded in place integrally within the canopy or are subsequently installed after molding and retained with an "E" clip. The shape of the pin 66 allows for ease in movement with respect to the rail 52, but could be of various other shapes.

The canopy rail 52 includes a first main channel 76 that is formed by an inboard section 80 of the rail 52 and an outboard section 82 of the rail 52. The inboard section 80 includes a channel 84 and the outboard section 82 includes a channel 86. The channels 84 and 86 are on opposite sides of the main channel 76 at a predefined height above a base of the main channel 76 and are parallel with a longitudinal axis of the canopy rail 52. Above the channels 84 and 86 are securing teeth 90 that are separated by predefined teeth gaps 92.

The canopy 50 mates with the canopy rail 52 as follows. The canopy 50 is lowered such that the pins 66 pass through the gaps 92 between the securing teeth 90 and become positioned within the channels 84 and 86. The bulk of the section 56 is received by the main channel 76 with the sides 60 and 62 below the pins 66 lodging adjacent to interior walls of the sections 80 and 82 that are below the channels 84 and 86. The canopy 50 is then slid forward or aft with respect to the canopy rail 52 in order to position each knob 66 between a base wall of the respective channels 84 or 86 and a securing tooth 90. The top of each pin 66 is now in contact with the bottom of the teeth 90. Contact between the securing teeth 90 and the pins 66 keeps the canopy 50 locked to the canopy rail 52.

In an alternate embodiment with respect to the embodiment shown in FIG. 2, a channel is molded into the bottom edge 70 of the canopy 50 (not shown). The channel receives an inflatable seal (not shown) that is located at the base of the main channel 76 of the canopy rail 52. The seal and channel produce a moisture and air pressure lock between the cockpit and the environment outside of the cockpit.

In another alternate embodiment with respect to the embodiment shown in FIG. 2, one of the walls or base that forms the channel 76 includes an inflatable seal (not shown). When the seal inflates, the seal makes contact with the canopy 50 and produces a moisture and air pressure lock.

Figure 3A:
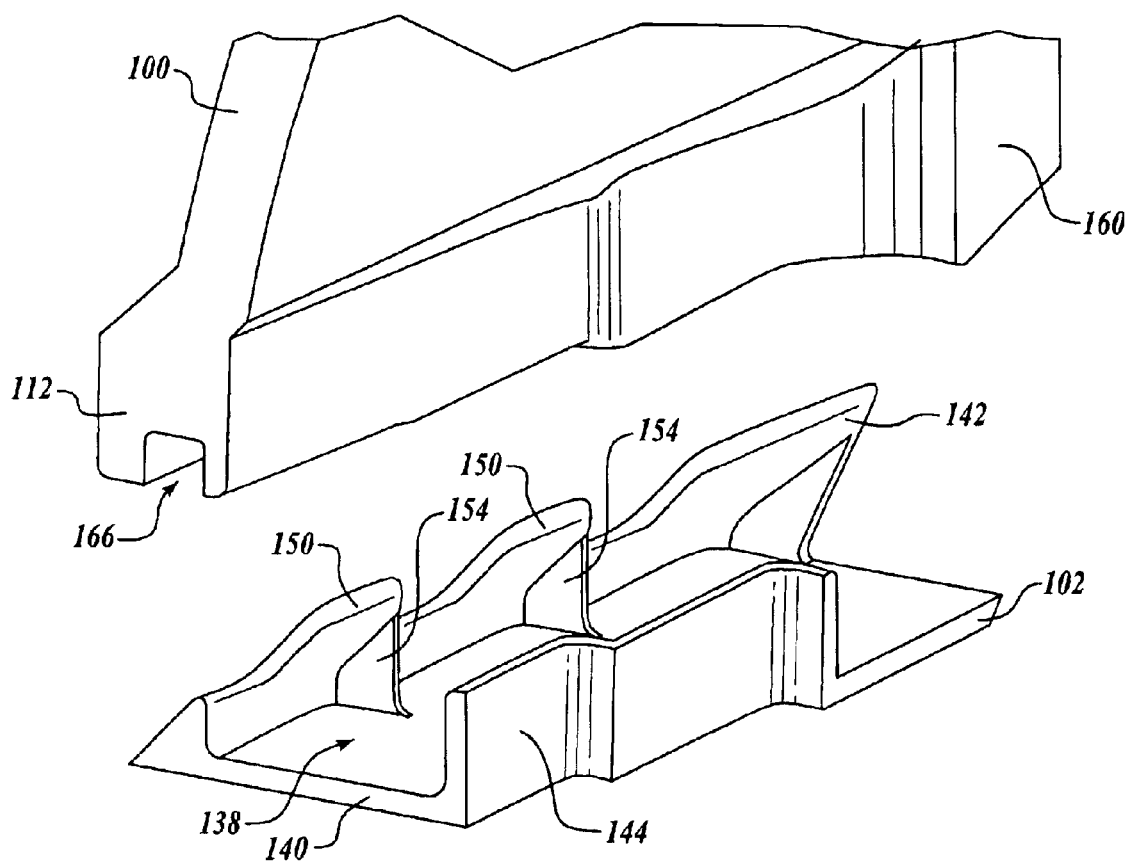
FIGS. 3A and 3B are perspective views of a portion of a frameless canopy and rail formed in accordance with a second embodiment of the present invention.
Figure 3B:
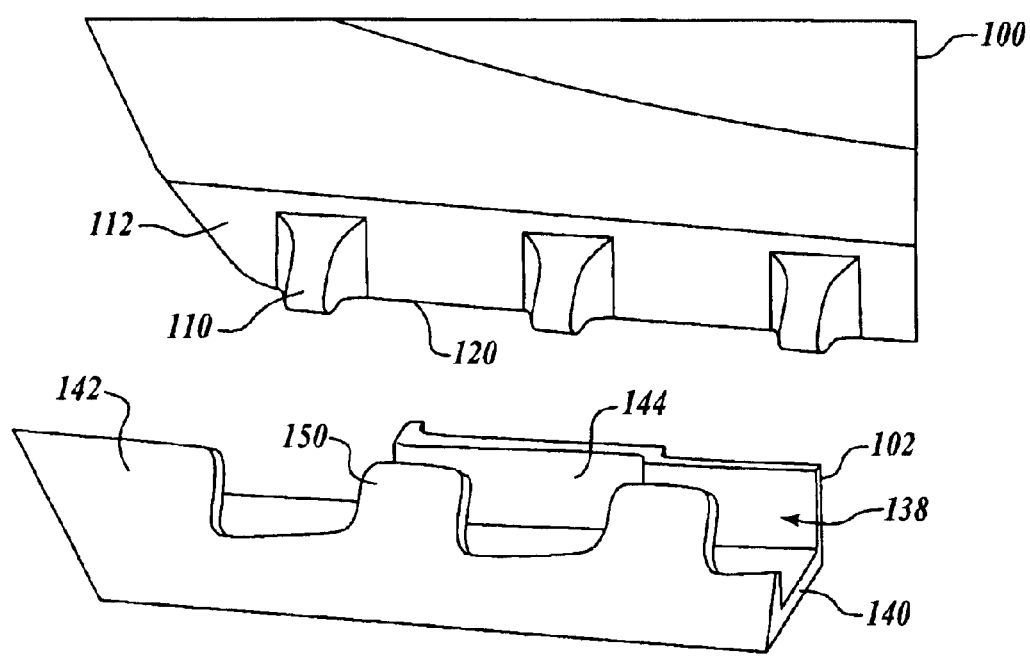

FIGS. 3A and 3B illustrate a second embodiment of attaching an injection-molded frameless canopy 100 to a canopy rail 102. The frameless canopy is injection molded to include protrusions 110 that protrude from an outboard side 112 of the canopy 100. The protrusions 110 protrude from a base edge 120 of the canopy 100 and slope back into the canopy 100. The protrusions 110 are spaced at predefined intervals on the outboard side 112.

The canopy rail 102 includes a channel 138 formed by a base 140, an outboard wall 142, and an inboard wall 144. The outboard wall 142 is sloped in order to match the slope of the protrusions 110. The outboard wall 142 includes equally spaced securing teeth 150. To close the canopy 100, the canopy 100 is positioned so that the protrusions 110 pass through gaps between the teeth 150 as the canopy 100 is inserted into the channel 138. Then, the canopy 100 is slid so that each protrusion 110 is secured under a securing tooth 150. The contact between the protrusions 110 and the respective tooth 150 keeps the canopy 100 mated with the rail 102. Wall sections 154 are attached to the base 140 of the channel 138 and the outboard wall 142 and are approximately perpendicular to the wall 142 and the base 140. Each wall section 154 is attached near one end of a tooth 150. The wall sections 154 stop motion of the canopy 100 past the teeth 150 by making contact with a side of the protrusions 110.

The canopy 100 includes an inboard side 160 that is molded according to the shape of the inboard wall 144 of the rail 102. In one embodiment, the wall sections 154 stop forward motion of the canopy 100 and the inboard wall 144 stops inboard motion of the canopy 100.

A channel 166 is molded into the base of the canopy 100. The channel 166 receives a seal (not shown) that is located on the base 140 of the canopy rail 102. When the canopy 100 is in place and secured to the canopy rail 102, (i.e., the protrusions 110 are secured in place behind respective teeth 150) the seal, such as without limitation a pneumatic or hydraulic bladder, mates within the channel 166 of the canopy 100 thereby providing a moisture and air pressure lock between the cockpit and the environment outside of the cockpit. Pneumatic or hydraulic system components within canopy rail 102 connect to pneumatic or hydraulic components within the vehicle when the rail 102 is closed and mated with the vehicle around the sill of the cockpit (not shown). When the structure 102 is secured to the aircraft around the canopy sill (not shown), the seal is inflated within the channel 166, thereby providing a pressure seal between the aircraft cockpit and the environment outside of the cockpit.

In an alternate embodiment with respect to the embodiment shown in FIGS. 3A and 3B, the channel 166 is not present and the base 140 includes an inflatable seal (not shown). When the seal inflates, the seal makes contact with the canopy 100 and produces a moisture and air pressure lock.

Figure 4:
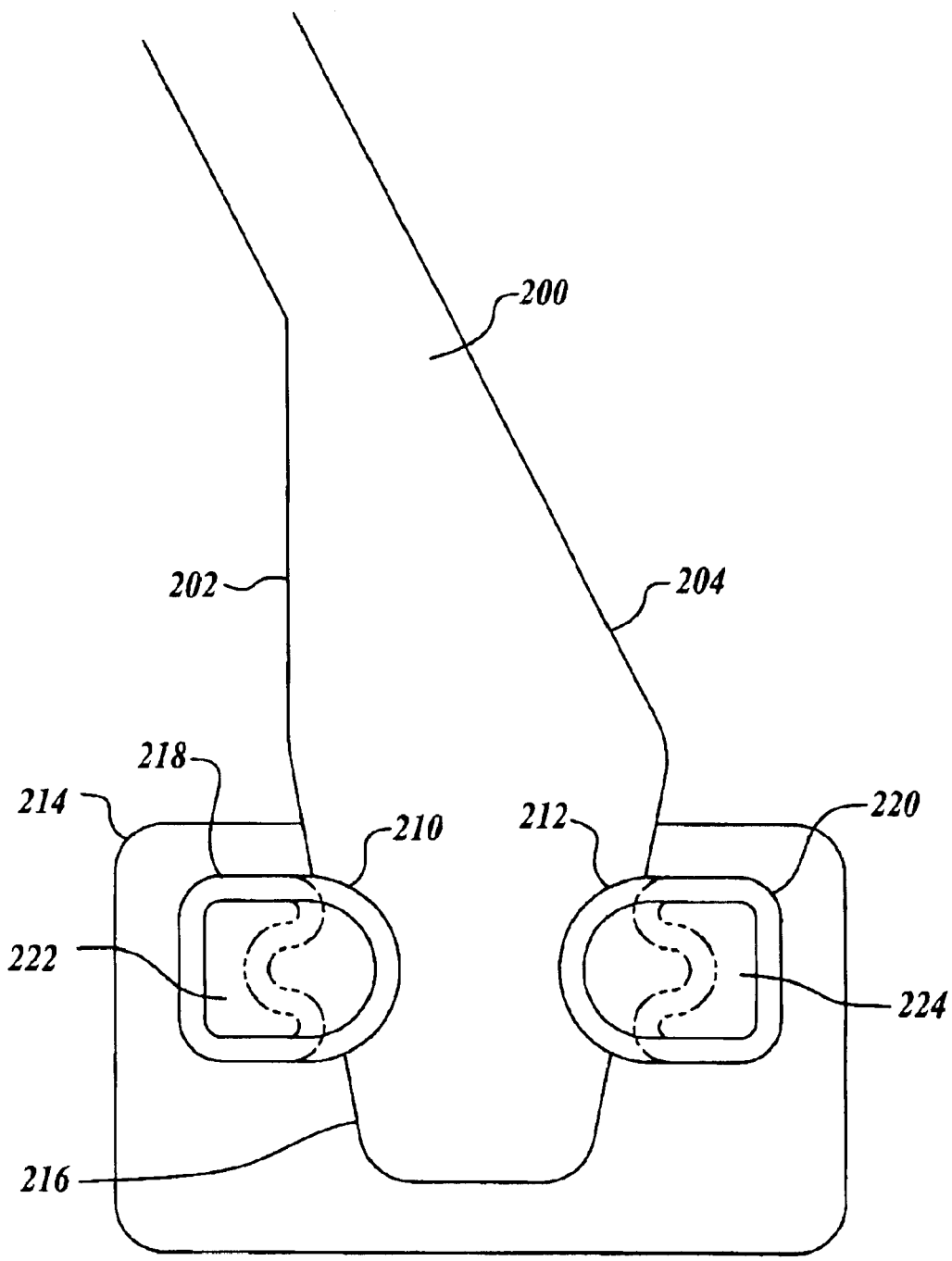
FIG. 4 illustrates a cross-sectional view of a frameless canopy and rail formed in accordance with a third embodiment of the present invention.

FIG. 4 illustrates a third embodiment of the present invention. A canopy 200 includes a first channel 210 molded into an inboard side 202 of the canopy 200 near the base of the canopy 200 and a second channel 212 molded within an outboard side 204 of the canopy 200 approximately opposite the first channel 210. A canopy rail 214 includes a channel 216 that is shaped to receive the canopy 200, so that the channels 210 and 212 are located within the channel 216. On approximately opposite sides of the channel 216 are first and second channels 218 and 220. The first and second channels 218 and 220 have inflatable seals 222 and 224 attached therein. The channels 218 and 220 are located on the sides of the main channel 216 at a height such that when the canopy 200 is properly inserted within the main channel 216, the channels 210 and 212 match the channels 218 and 220.

Before the canopy 200 is inserted into the canopy rail 214, the seals 222 and 224 are in an uninflated mode so that they do not significantly protrude into the main channel 216. Once the canopy 200 is properly seated within the main channel 216, the seals 222 and 224 are inflated by either air or fluid from a hydraulic or air pressure system within the vehicle. The inflated seals 222 and 224 securely mate within the channels 210 and 212, thereby, providing a mechanism of locking the canopy 200 to the rail 214 and for providing a moisture and air pressure lock between the cockpit and the environment outside the cockpit.

Figure 5:
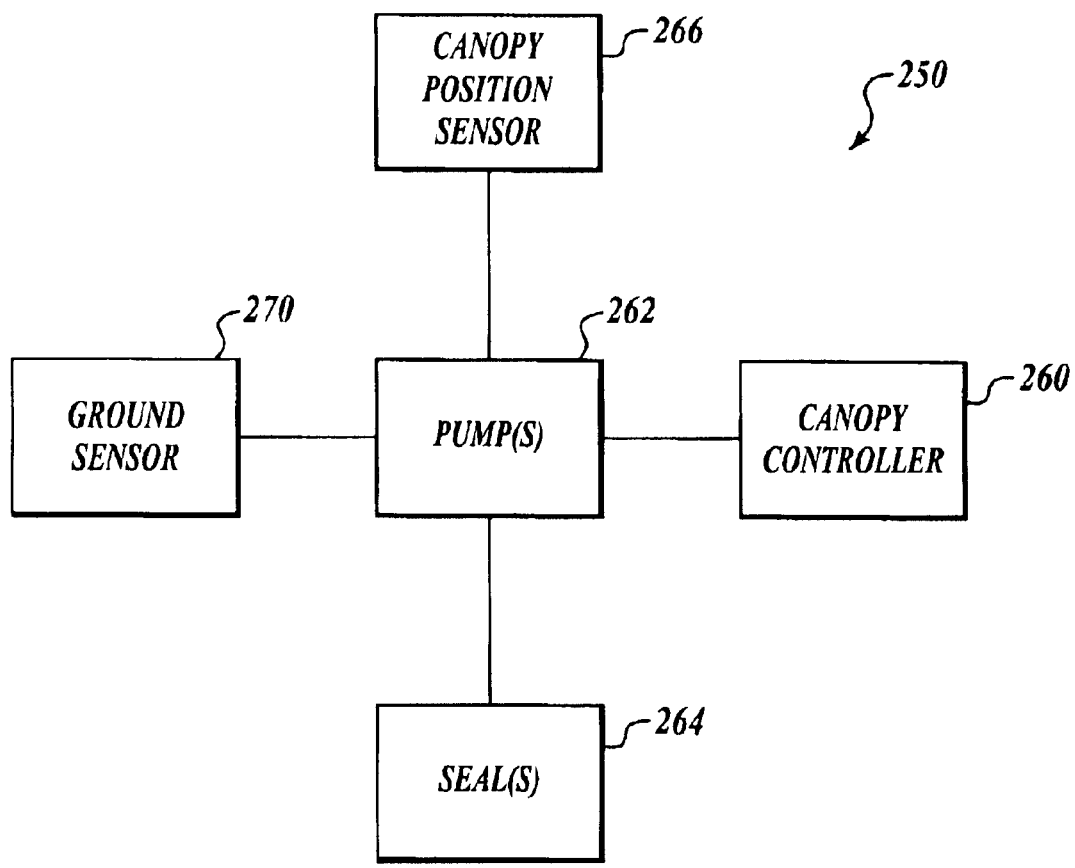
FIG. 5 illustrates a block diagram of components of the present invention.

FIG. 5 is a block diagram of the embodiments that include air or hydraulic seals that separate cockpit pressure from environment pressure or secure the canopy to the vehicle. A canopy seal system 250 includes a canopy position controller 260, one or more pumps 262, one or more seals 264, and one or more canopy position sensors 266. The system 250 includes a ground sensor 270 when the vehicle is an aircraft. When the canopy is closing as instructed by the canopy position controller 260 being in a close-canopy position, the canopy position sensor 266 sends a canopy closed signal to the one or more pumps 262 after the canopy has reached the closed position. In response to the canopy closed signal, the pumps 262 inflate the one or more seals 264 with a gas or a fluid.

When the canopy is closed and locked with inflated seals 264 and the canopy controller 260 is placed in an open-canopy position, the pumps 262 or a pressure relief valve (not shown) deflates the seals 264. After the seals 264 have sufficiently deflated, the canopy is opened. If the vehicle is an aircraft, the pumps 262 or a pressure relief valve (not shown) deflates the seals 264 when the canopy controller 260 is placed in an open-canopy position and the ground sensor 270 senses that the aircraft is on the ground.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A canopy system for a vehicle, the canopy system comprising:
    a canopy rail attached to the vehicle, the canopy rail including one or more inflatable seals; and
    an injection-molded canopy molded to be securely received by the one or more inflatable seals of the canopy rail.

2. The system of claim 1, wherein the canopy is at least one of a polycarbonate or acrylic frameless canopy.

3. The system of claim 1, further comprising:
    one or more canopy position sensors for sensing position of the canopy; and
    a sealing component for inflating the one or more seals based upon the sensed position of the canopy.

4. The system of claim 3, wherein the sealing component inflates the one or more seals with one of a liquid or gas when the canopy is sensed in a closed position.

5. The system of claim 4, further comprising:
    a canopy handle for controlling position of the canopy; and
    a ground sensor for sensing when the vehicle is on the ground,
    wherein the sealing component deflates the one or more seals, if the canopy handle is in an open canopy position and the vehicle is sensed to be on the ground.

6. The system of claim 1, wherein the canopy includes one or more channels for receiving the one or more seals.

7. The system of claim 1, wherein the vehicle is an aircraft.

8. A method for attaching an injection-molded canopy to a vehicle, the method comprising:
    providing a canopy rail attached to the vehicle, the canopy rail including one or more inflatable seals;
    securing an injection molded canopy to the canopy rail using the one or more inflatable seals.

9. The method of claim 8, further comprising:
    sensing a position of the canopy; and
    inflating the one or more seals based upon the sensed position of the canopy.

10. The method of claim 9, wherein inflating uses one of a liquid or a gas.

11. The method of claim 9, further comprising:
    controlling position of the canopy;
    sensing position of the vehicle relative to the ground; and
    deflating the one or more seals based on the controlled position and the sensed position of the vehicle relative to the ground.

12. The method of claim 9, wherein the canopy includes one or more molded channels for receiving the one or more seals.

13. The method of claim 8, wherein the canopy is at least one of a polycarbonate or acrylic frameless canopy.

14. The method of claim 8, wherein the vehicle is an aircraft.

15. A canopy system for a vehicle, the canopy system comprising:
    a canopy rail attached to the vehicle, the canopy rail including one or more flanges; and
    an injection-molded canopy having one or more molded protrusions,
    wherein the one or more flanges mate with the one or more protrusions of the canopy when the canopy is placed in a closed and locked position within the canopy rail.

16. The system of claim 15, wherein the canopy is at least one of a polycarbonate or acrylic frameless canopy.

17. The system of claim 15, wherein the vehicle is an aircraft.

* * * * *